(12) United States Patent
Canaia

(10) Patent No.: US 11,813,775 B2
(45) Date of Patent: Nov. 14, 2023

(54) SCREW PUMP MODULE FOR THE EXTRUSION OF PLASTIC MATERIALS

(71) Applicant: FIMIC S.R.L., Carmignano di Brenta (IT)

(72) Inventor: Erica Canaia, Carmignano di Brenta (IT)

(73) Assignee: FIMIC S.R.L.

( * ) Notice: Subject to any disclaimer, the term of this patent is extended or adjusted under 35 U.S.C. 154(b) by 103 days.

(21) Appl. No.: 17/378,055

(22) Filed: Jul. 16, 2021

(65) Prior Publication Data
US 2022/0016820 A1 Jan. 20, 2022

(30) Foreign Application Priority Data
Jul. 17, 2020 (IT) .................. 102020000017503

(51) Int. Cl.
*B29C 48/505* (2019.01)
*B29C 48/395* (2019.01)

(52) U.S. Cl.
CPC .......... *B29C 48/397* (2019.02); *B29C 48/505* (2019.02)

(58) Field of Classification Search
CPC ..... B29C 48/395; B29C 48/397; B29C 48/00; B29C 48/505; B29C 48/40; B29C 48/402; B29C 48/404; B29C 48/405; B29C 48/41; B29C 48/415; B29C 48/42; B29C 48/425; B29C 48/43; B29C 48/435; B29C 48/44; B29C 48/445; B29C 48/45; B29C 48/46; B29C 48/465; B29C 48/467; B29C 48/468
See application file for complete search history.

(56) References Cited

U.S. PATENT DOCUMENTS

| | | | |
|---|---|---|---|
| 2,607,077 A | 8/1952 | Dulmage | |
| 2,746,089 A * | 5/1956 | Hendry | B29C 48/395 264/328.14 |
| 3,203,350 A | 8/1965 | Chang | |
| 3,797,550 A | 3/1974 | Latinen et al. | |
| 4,310,251 A | 1/1982 | Scharer et al. | |
| 2010/0176527 A1* | 7/2010 | Fischer | B29C 48/625 366/77 |
| 2015/0086669 A1* | 3/2015 | Henke | B29C 48/387 425/382.3 |
| 2017/0037216 A1* | 2/2017 | Lv | B29C 48/832 |
| 2018/0079120 A1* | 3/2018 | Myers | B29B 7/7461 |

FOREIGN PATENT DOCUMENTS

| | | | | |
|---|---|---|---|---|
| DE | 3615586 C | 5/1987 | | |
| EP | 907492 A1 | 4/1999 | | |
| EP | 907492 B1 * | 10/2000 | ......... B29C 47/0076 |
| FR | 1048701 A | 12/1953 | | |
| JP | 56000139 A | 1/1981 | | |
| JP | 59159328 A | 9/1984 | | |
| WO | 9742019 | 11/1997 | | |

* cited by examiner

*Primary Examiner* — S. Behrooz Ghorishi
*Assistant Examiner* — John W Hatch
(74) *Attorney, Agent, or Firm* — QuickPatents, Inc.; Kevin Prince

(57) ABSTRACT

This concerns a screw pump for the extrusion of plastic materials, which is extremely compact and so it can be inserted in-line in a plastic material filtration system, encapsulating within it a duct parallel to the axis of the screw.

8 Claims, 8 Drawing Sheets

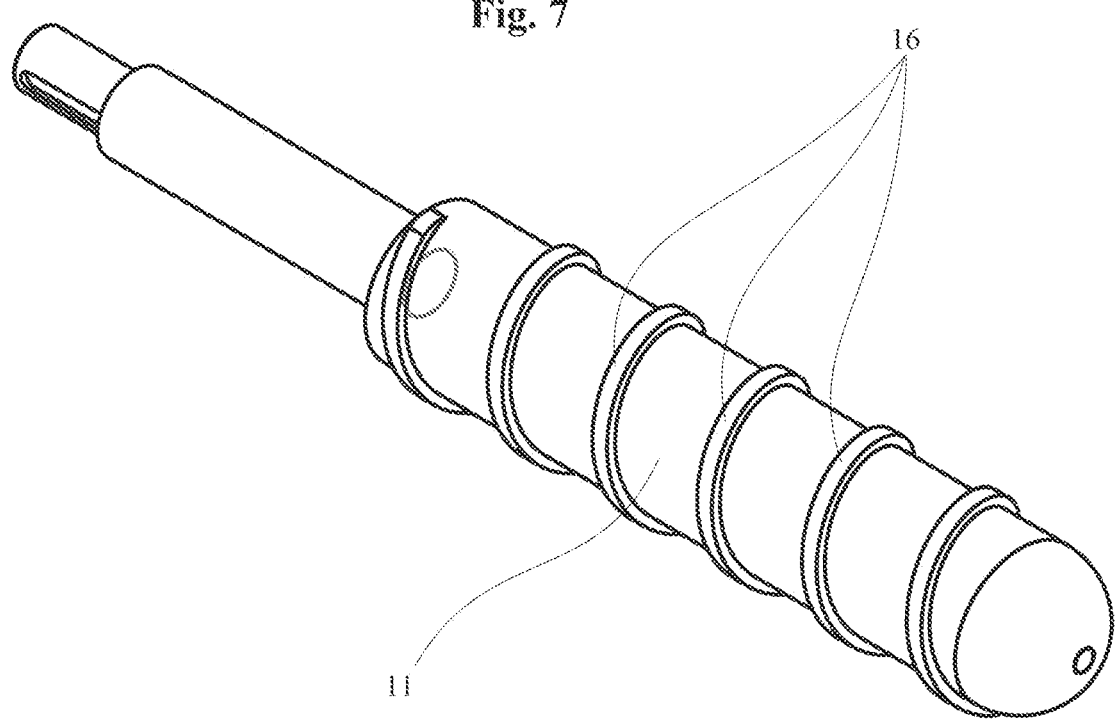

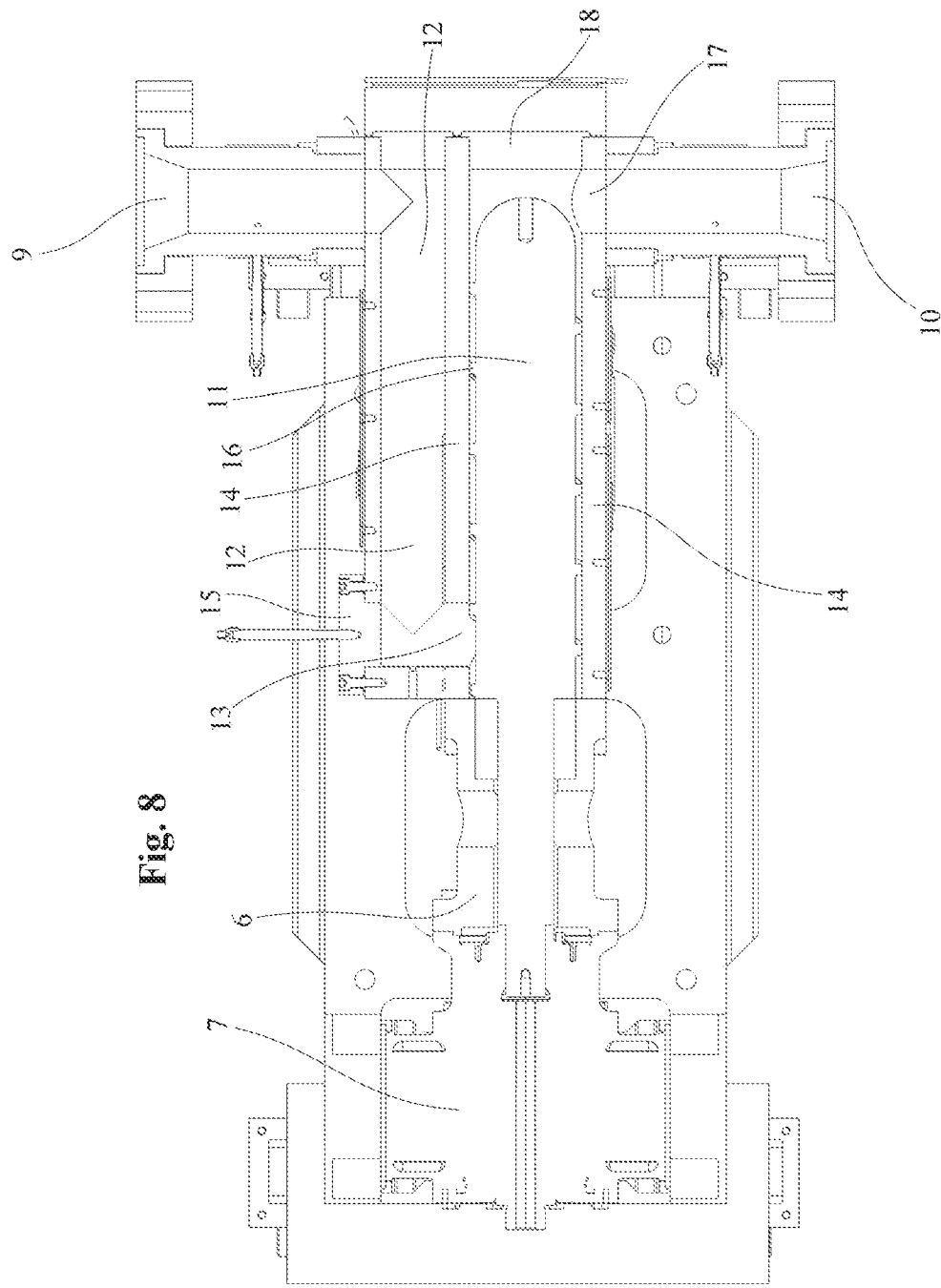

SCREW PUMP MODULE FOR THE EXTRUSION OF PLASTIC MATERIALS

CROSS-REFERENCE TO RELATED APPLICATIONS

This application claims the benefit of Italian Patent Application 10/2020/000017503, filed on Jul. 17, 2020, and is incorporated herein by reference.

STATEMENT REGARDING FEDERALLY SPONSORED RESEARCH AND DEVELOPMENT

Not Applicable.

FIELD OF THE INVENTION

The object of the present invention relates to a screw pump for the extrusion of plastic materials.

BACKGROUND

It is known that in the field of processing and/or recycling plastic materials, a very complex system for the treatment of plastic materials is required. Fundamental components of these systems are the pumps, namely, that part of the systems that can be adapted along the process for plasticizing, the feeding of the extruders, but also before or after the filtration units.

The purpose of these pumps is to transfer the molten material to the various operating machines and/or to confer the required pressure at the inlet e.g. for the extruder or the granulator or for transferring the molten material from a rougher unit filter to a finishing filter with adequate pressure.

Although gear pumps were preferable, these were found to be very delicate from the point of view of the molten material to be treated, since they could only admit material with a very low degree of contamination.

Currently the feed unit of an extruder has a long screw inside a cylinder, which rotates, feeding, compressing, and plasticizing the incoming material and returning it at the end ready for subsequent processing.

In order to carry out the aforementioned functions, the screw has a helical circumferential profile that can have a variable pitch and height of the threads along the axis of advancement. However, the number of revolutions of the single screw is the same for the entire length of the screw, being constant and impressed at one end by an electric motor using a reduction gear.

Therefore, the screw must be the right size for the torsional stress exerted by the gear motor, taking into account the length of the screw and the distributed resistances and friction.

The plant engineering complexity of the assembly must also be taken into account, since the plastic material, when it is being processed inside the cylinder, is subjected to high temperatures and significant pressures; it generates gases that must be expelled/released outside the cylinder. Usually this is accomplished using a specially dimensioned degassing operation, but at the same time this considerably complicates the continuity of the cylinder within which the plasticizing screw rotates.

The consolidated structuring of a pump as a single element for the aforementioned operations is, therefore, a compromise between performance and features.

Depending on the construction design choices, the size, the length, and the diameter of the screw remain fixed and cannot be changed during the entire useful life of the device. In order to make slight variations to these fixed properties, the motor is very often equipped with a variable speed drive, but even in this case it is a compromise between the various functions. Furthermore, the size of the motor must be much more oversized than for normal use, assuming that on some occasions the device can be used well beyond its normal operating parameters.

The values of the actual loads involved are considerable, for screws even several meters long and for material pressures that inside the cylinder can far exceed hundreds of pressure bars, and therefore making the drive motor larger even just by a few percentage points compared to nominal operating values has a very significant impact.

Furthermore, it must also be taken into account that the processed material very often has different characteristics, starting from the degree of pollution to its chemical formulation, to the desired final degree of purity or to the conditions in which the various components are found (percentage of the filter not clogged).

Finally, it should not be forgotten that the molten material must be kept at temperature to allow it to be processed, with enormous energy expenditure for heating along the entire length of the pump.

Sometimes, some part must be adjusted to a different temperature and so it is also necessary to use expensive cooling devices, since this must be provided along all or part of the length.

All the aforementioned characteristics, which the pump must in any case have, mean that the entire assembly has a length and height with a linear insertion on the system that would require a site that can contain these considerable dimensions of dozens of meters.

It is quite clear that once everything has been installed, it does not have the flexibility to be adapted, unless everything is completely reworked.

Stopping the pump for maintenance or for unforeseen events requires lengthy and expensive interventions to get it back into working order and fully operational.

SUMMARY OF THE INVENTION

Object of the Invention

The object of the present invention relates to a screw pump module for molten plastic material, which overcomes one or more of the drawbacks of the known art.

A further object of the present invention is to provide a screw pump module for molten plastic material that can be more compact from a dimensional point of view than a traditional solution.

A different object of the present invention is to make available a screw pump module for molten plastic material that is easier to configure than a traditional solution.

Another object of the present invention is to provide a screw pump module for molten plastic material that is less subject to friction and resistance than a traditional solution.

An important object of the present invention is to provide a screw pump module for molten plastic material that can use screws of varying diameters.

Another object of the present invention is to provide a screw pump module for molten plastic material that makes it easy to degas following the plasticization process.

Another important object of the present invention is to make available a screw pump module for molten plastic material whose power requirements of the motors moving the screw is lower than the corresponding traditional solution.

All the aforesaid objects, and others which will become more apparent from the continuation of the description, are obtained from the invention characterized by the features highlighted in the claims.

EXPLANATION OF THE INVENTION

In particular, this is a screw pump module comprising:
a drive motor;
a body equipped with an inlet and an outlet for the molten material;
a hollow cylinder with an inlet and outlet;
a screw that has a helical thread around the circumference;
a connecting duct between the inlet of the hollow cylinder and the inlet of the body, or
a connection duct between the outlet of the hollow cylinder and the outlet of the body
where said screw is rotated by said motor and
where inside said hollow cylinder said screw with a helical thread rotates, and
where said molten material enters from the inlet of the hollow cylinder and, following the rotation of said threaded screw, exits from the outlet of said hollow cylinder;
and where said inlet and said outlet of the body are arranged at the same end of said body, and preferably with the same main axis;
and where inside said body there is said connection duct through which the molten material, having entered from the inlet of the body, reaches the inlet of the hollow cylinder; or
through said connection duct the molten material exiting the hollow cylinder reaches the outlet of the body,
and where said connection duct is arranged with an axis preferably parallel to the main axis of the screw.

ADVANTAGEOUS CHARACTERISTICS OF THE INVENTION

Advantageously, the object of the invention has a single-function screw, therefore the system can be correctly and precisely dimensioned for said function for which the screw has been designed.

Advantageously, the pump module is compact for the function to be performed, having a flange for the inlet and a flange for the outlet of the molten material arranged on a coinciding axis.

Advantageously, the pump module has a terminal support for the end of the screw, consisting of a bushing or a bearing preventing the screw from resting on the inner surface of the cylinder and preventing the sliding friction of the helical thread on the inner surface of the hollow cylinder.

Advantageously, the motor of the pump module is dimensioned precisely, with lower power consumption, since the screw has less friction and has been precisely set for the force required for the function of the screw.

Advantageously, the pump module can be positioned in a flexible manner due to the limited overall dimensions of the assembly.

Advantageously, the pump module can be modularly connected with other pump modules or with other elements of the system by positioning a flanged inlet and outlet at 90° to the main axis of the screw.

Advantageously, each pump module has a modular structure but varies its main characteristics in light of the functions to be performed just by modifying the screw inside the hollow cylinder.

Advantageously, each pump module can be adjusted individually and the rotation speed can be varied, independent of the speed of the other modules placed alongside and/or present in the system.

Advantageously, the sum of the power consumption of the single motors of each pump module is lower than the power consumption of a single motor that should operate a single device with equivalent processing.

Advantageously, the screw is precisely dimensioned for the function carried out by the single modular element, without oversizing for the additional torsions that would occur in the case of several functions carried out by the continuation of successive screws.

Advantageously, the pump module is easy to inspect and is equally easy to maintain, since both the inlet and outlet of both the module, the cylinder and also the connection duct are open or can be opened by removing suitable caps.

Advantageously, the pump module can easily be adapted to a specific function by inserting a screw with a specific helical thread profile.

DESCRIPTION OF THE DRAWINGS

The technical characteristics of the invention, according to the aforementioned objects, can be clearly seen from the content of the claims below and the relative results will be apparent in the detailed description that follows with reference to the drawings, which illustrate a purely exemplary and non-limiting embodiment, in which:

FIG. 7 shows an example of a perspective view of a screw with a helical thread; and FIG. 8 shows a view, corresponding to FIG. 6, with the screw further sectioned.

DETAILED DESCRIPTION OF THE PREFERRED EMBODIMENT

Figure 1:
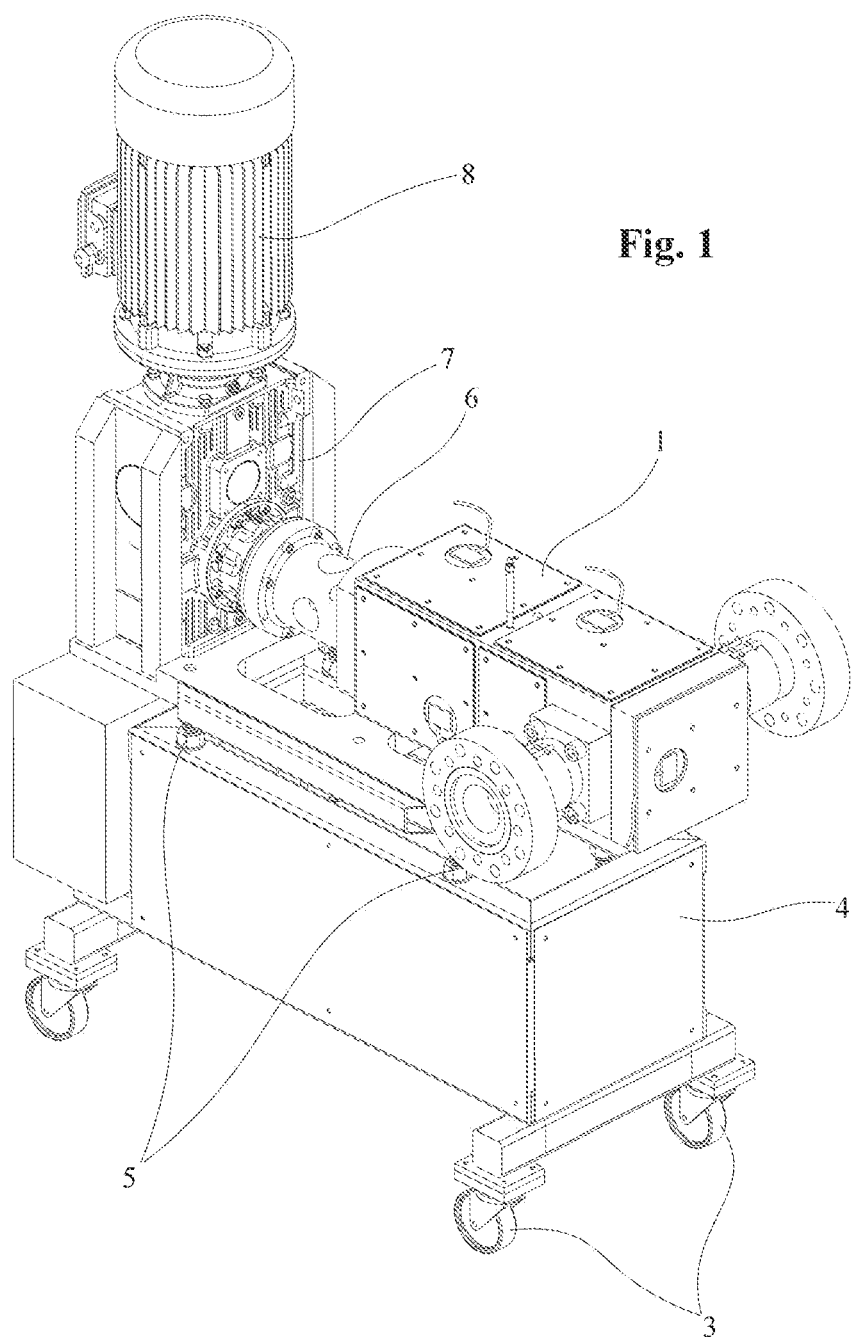
FIG. 1 shows a perspective view of the pump module that is the object of the invention placed above a wheeled support.
Figure 2:
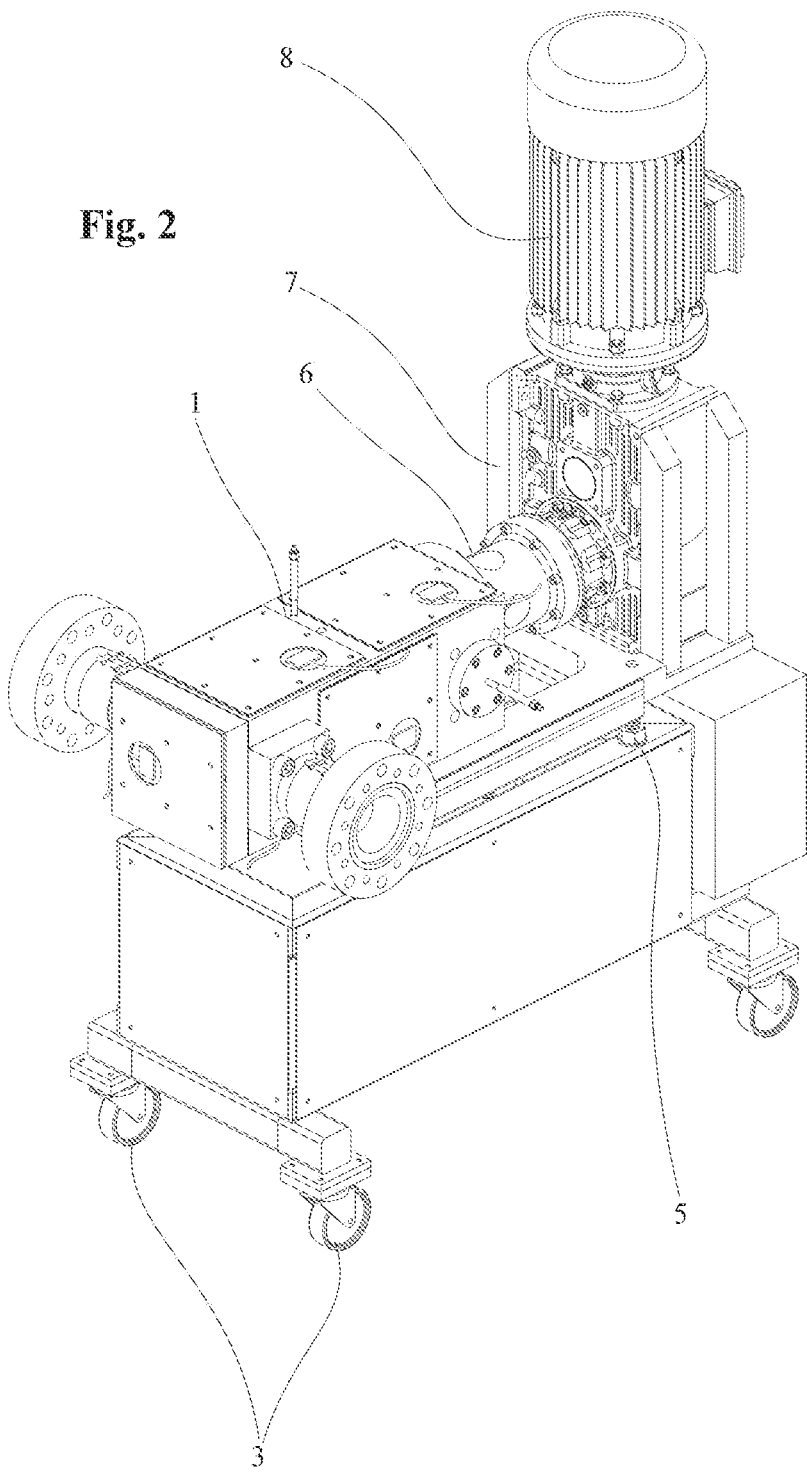
FIG. 2 shows a different perspective view of the pump module of FIG. 1.
Figure 3:
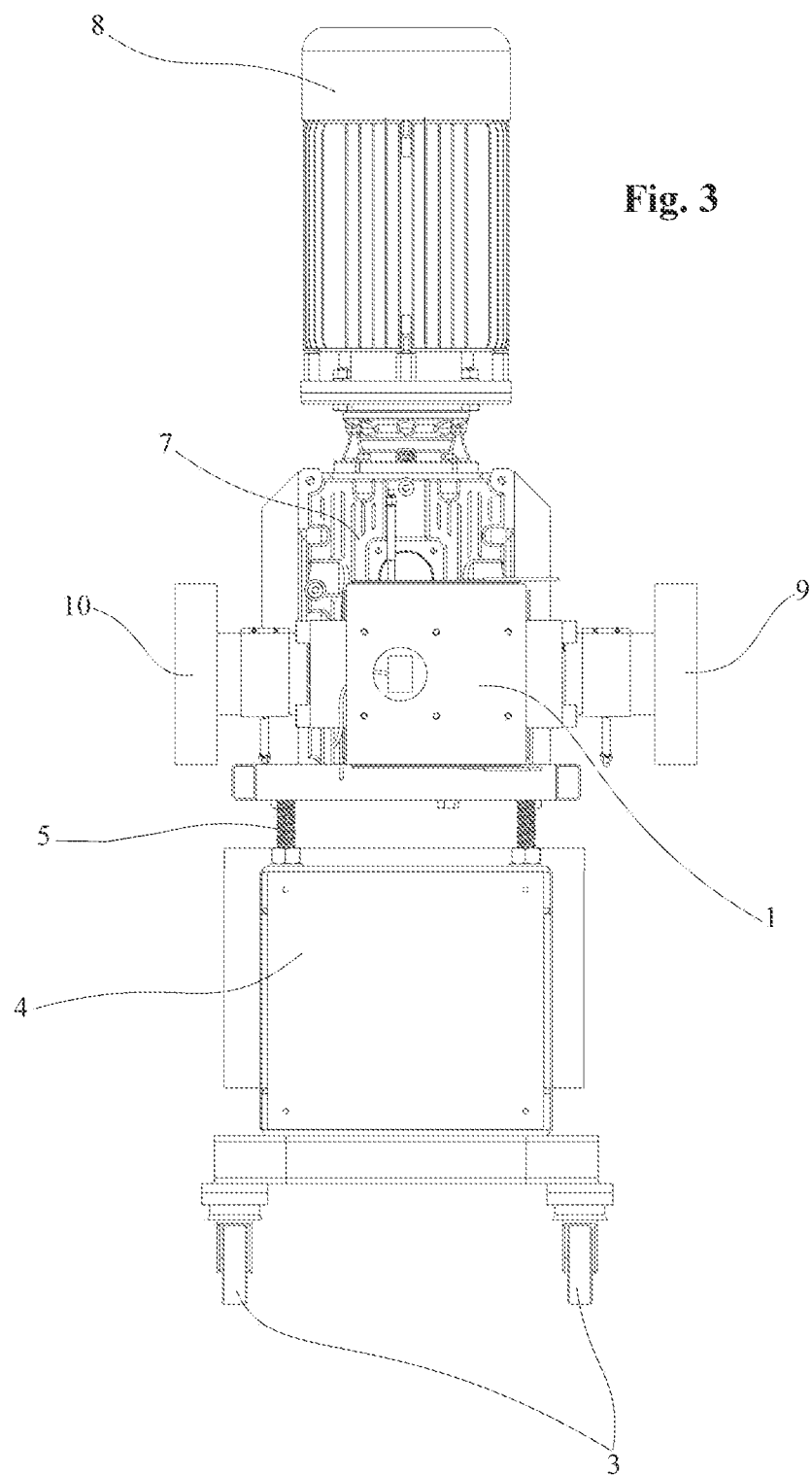
FIG. 3 shows a front view of the pump module of FIG. 1 with the flanged inlet and outlet set at the same height.
Figure 4:
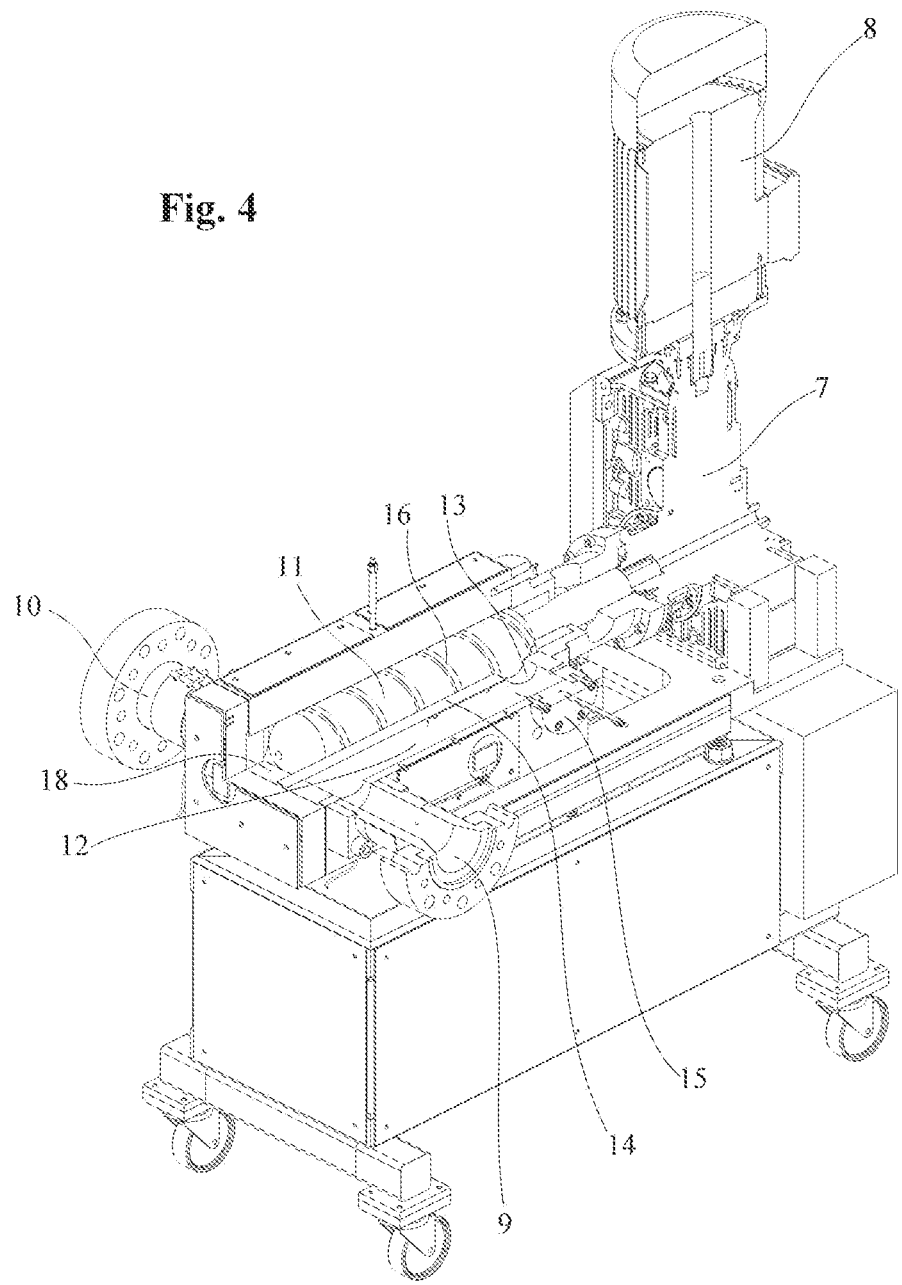
FIG. 4 shows a partially sectioned view of the pump module of FIG. 2.
Figure 5:
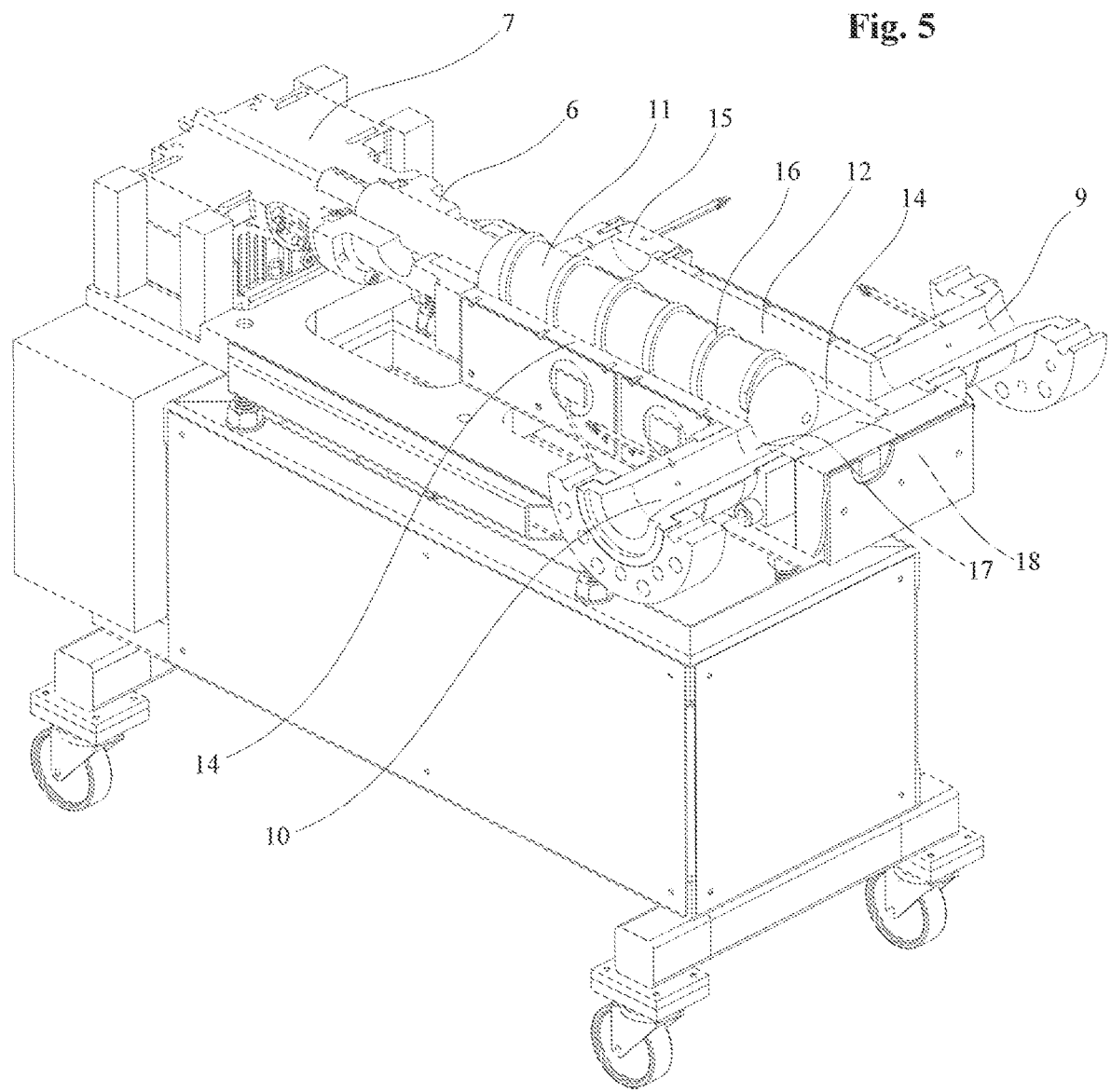
FIG. 5 shows a partially sectioned view of the pump module of FIG. 1.
Figure 6:
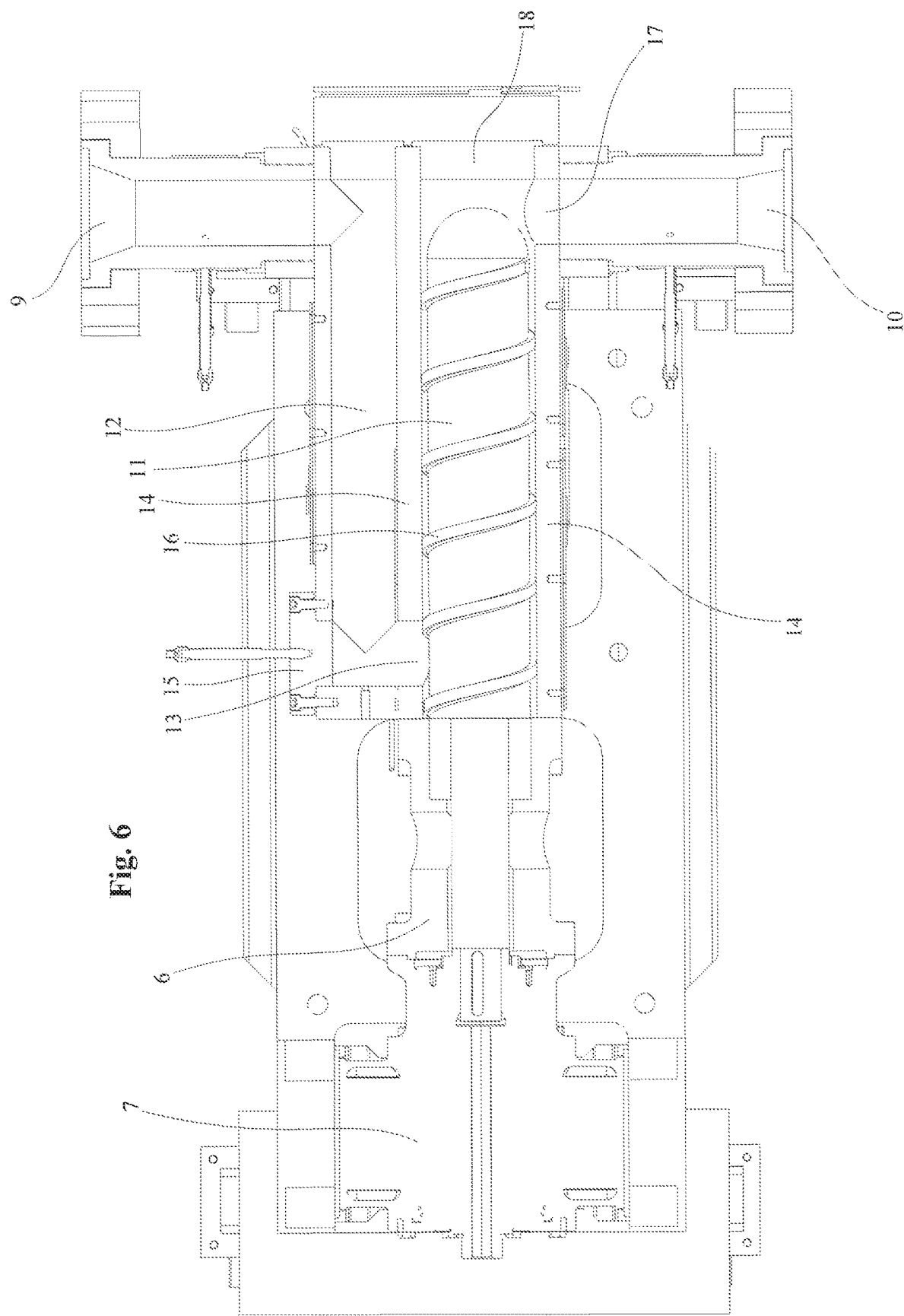
FIG. 6 shows a top section view of the pump module, with the exception of the screw, with clear paths of the molten material from inlet to outlet.

With reference to the drawings, the object of the innovation revolutionizes the system of feeding the pump of a screw extruder by optimizing energy consumption, which is certainly lower due to there being less friction and taking into consideration the total energy required for a pump made from different corresponding elements placed in series.

Above all, with the system of the invention, it is possible to split what traditionally was the single screw of the pump, which was tasked with the compression, plasticization, degassing, etc., in various modules, each specifically specialized for a limited set of functions and preferably for a single function.

The object of the invention also allows you, given the modularity of the pump module, to place the various modules in series, and it has not increased the total length, as would have been expected for a number of elements in series, but actually limits its overall length due to the presence of the connection duct, which is a return or recovery duct, that connects the inlet of the module with the initial part of the hollow cylinder, or which connects the outlet with the final part of the hollow body.

Preferably by placing the inlet and outlet of the pump module on the same side, the inlet and outlet flanges are kept coaxial.

Preferably by placing the screw with the main axis at 90° to the axis of the in-line connection of the inlet and outlet, the system becomes even more compact.

Advantageously, each screw of each pump module is powered by a single motor using a suitable reduction gear, thus it is possible to calculate the power of the motor much more precisely for the required needs, and also it is possible to individually vary the torque and the number of revolutions specifically for the required use and the specific function to be performed.

Structurally, each individual pump module 1 can be supported by a suitable support 2, possibly trolley-mounted with wheels 3, which makes it extremely simple and practical to move for an easy and quick installation. Furthermore, a pump module 1 supported in this way makes it very inexpensive to maintain and/or replace in the event of breakages or scheduled interventions.

Said support 2 comprises a base 4 provided with height adjusters 5 in order to be able to reach, fix and maintain the pump module 1 at the correct height for its installation in the system.

The pump module 1 is connected through a spacer collar 6 to a gear motor 7 directly connected to the screw and driven by a suitable drive motor 8.

An advantage of the system is precisely that of having a dedicated motor 8, so that it can be adjusted according to contingent needs, for example, if installed after an extruder, the pump module can increase the pressure of the molten plastic for the use of the component, whatever it is.

However, this pump module can also be mounted between a rougher filter changer and a finisher filter changer.

The capacity of this pump module is that it can bring the working pressure from a pressure of a few bars, of the molten material leaving the previous machine, to the pressure required by the next machine.

The pump module 1 comprises an inlet flange 9 for the entry of the molten material, and an outlet flange 10 for the exit of the molten material.

Said inlet flange 9, and possibly also the outlet flange 10, is preferably positioned at 90° to the main axis of the compression screw 11, allowing you to significantly limit the space between the inlet and outlet of the material.

Advantageously, said inlet flange 9 and said outlet flange 10 are positioned with their main axis coinciding, allowing you to maintain the linear implementation and connection of the previous machines and the machines following the pump module.

To obtain the aforementioned characteristic, the pump module 1 comprises a connection duct 12 which hydraulically connects the inlet flange 9 with the inlet 13 of the hollow cylinder 14 within which the screw 11 rotates.

Said connection duct 12 feeds the screw 11 with the molten material coming from the inlet of the inlet flange 9. It has been found that along said connection duct 12, there is no appreciable increase in pressure or any other form of alteration of the plastic material involved.

To make it easier to maintain the pump module 1 near the inlet of the hollow cylinder 13, there is a removable plug (plug towards gear motor) 15 for accessing and inspecting the end part of the connection duct 12 that opens on the inlet of the hollow cylinder 13.

In this way, said connection duct 12 can easily be accessed at its ends even in the event that it becomes obstructed or needs to be inspected.

Preferably, said connection duct 12 is parallel and laterally spaced from the screw 11, outside the hollow cylinder, keeping the space occupied by the hollow cylinder 14 to a minimum.

This configuration is also optimal for heating, for maintaining the temperature of the molten material and also for reducing heat loss, in fact the outer surface of the module is only slightly higher compared to a configuration that includes only the hollow cylinder, and the temperature of the molten material is kept at the same level for the material present in the connection duct 12 and also for the material processed by the screw 11 with the various electric heating elements placed on the perimeter surfaces of the pump module 1.

The screw 11 located within the hollow cylinder 14 has a helical thread 16 on the circumference for shifting the material from the inlet of the hollow cylinder 13 to the outlet of the hollow cylinder 17.

During this displacement of the molten material, from the inlet to the outlet of the hollow cylinder 14, the plastic material undergoes an increase in pressure and/or plasticization or other modifications related to the function of the screw itself and to the configuration of the helical thread 16.

These functions can be finely adjusted by modifying the torque and the number of revolutions of the motor 8 that rotates the screw 11 using the gear motor 7.

This peculiarity of having a motor 8 dedicated to the single screw 11 inside the pump module not only optimizes the result at the outlet from the outlet flange 10, as regards the characteristic parameters of the molten material, such as, for example, temperature, pressure, degree of plasticization, but also achieves that flexibility and compactness that are the purposes of the invention.

Advantageously, in fact, the motor 8 is positioned orthogonally to the axis of the screw and preferably vertically, and has a series of accessory elements that are, given the powers, limited to the motor only, of limited size (electrical panel, cable sizing, etc.)

In fact, a screw 11 of limited length, such as the one inside the pump module that is the object of the invention, is not subject to high levels of friction on the hollow cylinder 14 and can be supported in a cantilevered position by the spacer collar 6.

Advantageously and for greater safety, it is possible to support the end of the screw 11 near the outlet of the hollow cylinder 17 using a bearing in the cover cap 18 of the hollow cylinder 14. Said covering cap 18 can easily be removed and allows axial access to the inside of the hollow cylinder 14 for any maintenance and/or other inspection operations, or even facilitating the replacement of the screw.

However, considering the large sections of the inlet and outlet openings and the limited friction, said pump module is not subject to any drawbacks, and can process and manage contaminated material without modest limits, both in terms of size and percentage of contamination of the usual pumps and especially those with gears.

What is claimed is:

1. A screw pump module for extrusion of plastic materials, comprising:
   a drive motor;
   a body with an inlet and an outlet for a molten plastic material;
   a hollow cylinder with an inlet and an outlet;
   a screw with a helical thread around a circumference of the screw;
   a first connection conduit between the inlet of the hollow cylinder and the inlet of the body; or
   a second connection conduit between the outlet of the hollow cylinder and the outlet of the body;
   wherein said screw is rotated by said drive motor;
   wherein inside said hollow cylinder said screw with the helical thread rotates;
   wherein the molten plastic material enters from the inlet of the hollow cylinder and, following the rotation of said screw with the helical thread, exits from the outlet of said hollow cylinder;
   wherein said inlet of the body and said outlet of the body is at a common end of said body;
   wherein said inlet of the body and said outlet of the body are respectively equipped with a flange for the inlet of the body and a flange for the outlet of the body of the molten plastic material, and wherein the flanges are positioned with a coincident axis;
   wherein inside said body is said first connection conduit through which the molten plastic material that enters from the inlet of the body reaches the inlet of the hollow cylinder; or through said second connection conduit the molten plastic material leaving the hollow cylinder reaches the outlet of the body; and
   wherein said first connecting conduit is positioned with an axis thereof substantially parallel to a main axis of the screw.

2. The screw pump module of claim 1 wherein said pump module has a single-function screw.

3. The screw pump module of claim 1 wherein a support for a terminal end of the screw includes a bushing or a bearing.

4. The screw pump module of claim 1 wherein said drive motor of the pump module is designed to provide a power corresponding to a force required for operation of the screw.

5. The screw pump module of claim 1 wherein said inlet of the body and said outlet of the body each include a flange, and are positioned at 90° with respect to the main axis of the screw.

6. The screw pump module of claim 1 wherein said hollow cylinder has a cover cap axially coincident with the main axis of the screw, the cover cap sized to allow the screw to be inserted in and removed from the hollow cylinder, thereby providing access to the screw.

7. The screw pump module of claim 1 wherein the screw inside the hollow cylinder can be replaced with a corresponding screw having a different helical thread.

8. The screw pump module of claim 1 further including a plurality of cover caps, one cover cap covering each of an end part of the screw, the outlet of the hollow cylinder, a reducer side at an initial part of the screw, the inlet of the hollow cylinder, and an end part of the first connection conduit, where said cover caps are openable.

* * * * *